(12) United States Patent
Takumori (10) Patent No.: US 7,992,462 B2
(45) Date of Patent: Aug. 9, 2011

(54) RESIN DOUBLE-HELICAL GEAR

(75) Inventor: Toru Takumori, Kawaguchi (JP)

(73) Assignee: Enplas Corporation, Saitama (JP)

( * ) Notice: Subject to any disclaimer, the term of this patent is extended or adjusted under 35 U.S.C. 154(b) by 725 days.

(21) Appl. No.: 12/077,342

(22) Filed: Mar. 19, 2008

(65) Prior Publication Data

US 2008/0229858 A1 Sep. 25, 2008

(30) Foreign Application Priority Data

Mar. 23, 2007 (JP) ................................ 2007-076402

(51) Int. Cl.
*F16H 55/08* (2006.01)
*F16H 55/17* (2006.01)

(52) U.S. Cl. ......................................... 74/457; 74/459.5

(58) Field of Classification Search .................... 74/457, 74/458, 459.5, 461, 462, DIG. 10; 29/893.35
See application file for complete search history.

(56) References Cited

U.S. PATENT DOCUMENTS
6,912,786 B2 * 7/2005 Jinkins et al. .............. 29/893.35

FOREIGN PATENT DOCUMENTS
JP 10-315344 12/1998
* cited by examiner

*Primary Examiner* — Richard W L Ridley
*Assistant Examiner* — Phillip A Johnson
(74) *Attorney, Agent, or Firm* — DLA Piper LLP (US)

(57) ABSTRACT

In a resin double-helical gear formed by injection-molding, smooth meshing of teeth can be performed for rotation of the resin double-helical gear in both directions, and occurrences of thrust-direction load and noise can be prevented.

Peak-side tooth flanks $7c$ and $7d$ and valley-side tooth flanks $7e$ and $7f$ of a tooth 7 in a resin double-helical gear 1 are formed such as to become farther away from peak-side tooth flanks $9c$ and $9d$ and valley-side tooth flanks $9e$ and $9f$ of a standard tooth 9 in an inward direction, the closer the peak-side tooth flanks $7c$ and $7d$ and the valley-side tooth flanks $7e$ and $7f$ are to a tooth width direction center section 3 from one tooth width direction end section $4a$ and another tooth width direction end section $4b$. As a result, meshing escape sections g (g1 and g2) and h (h1 and h2) having dimensions in a tooth thickness direction that increase towards the tooth width direction center section 3 are formed on the peak-side tooth flank side and the valley-side tooth flank side.

2 Claims, 5 Drawing Sheets

RESIN DOUBLE-HELICAL GEAR

BACKGROUND OF THE INVENTION

1. Field of the Invention

The present invention relates to a resin double-helical gear.

2. Description of the Related Art

Conventionally, a resin helical gear is widely used as a power transmission mechanism in automobile components, precision machinery, various electronic devices, and the like, in addition to office equipment, such as copiers, printers, and facsimile machines. This is because the resin helical gear has the following advantages attributed a structural characteristic of the resin helical gear in that teeth of the resin helical gear are twisted. The advantages are that power transmission can be performed quietly because meshing is smooth even during high-speed rotation, and a high-load power transmission can be performed because load can be easily dispersed along a tooth trace.

At the same time, the resin helical gear has a following disadvantage because the teeth are twisted. In other words, an axial-direction thrust load proportional to a transmission torque is generated during power transmission. Therefore, a structure for receiving the thrust load is required. To resolve this disadvantage, a configuration in which the thrust load is received by a thrust bearing can be considered. However, in actuality, it may not be possible to dispose the thrust bearing because of spatial constraints and structural constraints of the power transmission mechanism.

Therefore, a technology has been developed for forming a following resin double-helical gear by injection-molding. Like the resin helical gear, the resin double-helical gear is quiet and capable of performing high-speed and high-load power transmission. Moreover, unlike the resin helical gear, the thrust load is not generated in the resin double-helical gear during power transmission (refer to Patent Literature 1).

Figure 9:
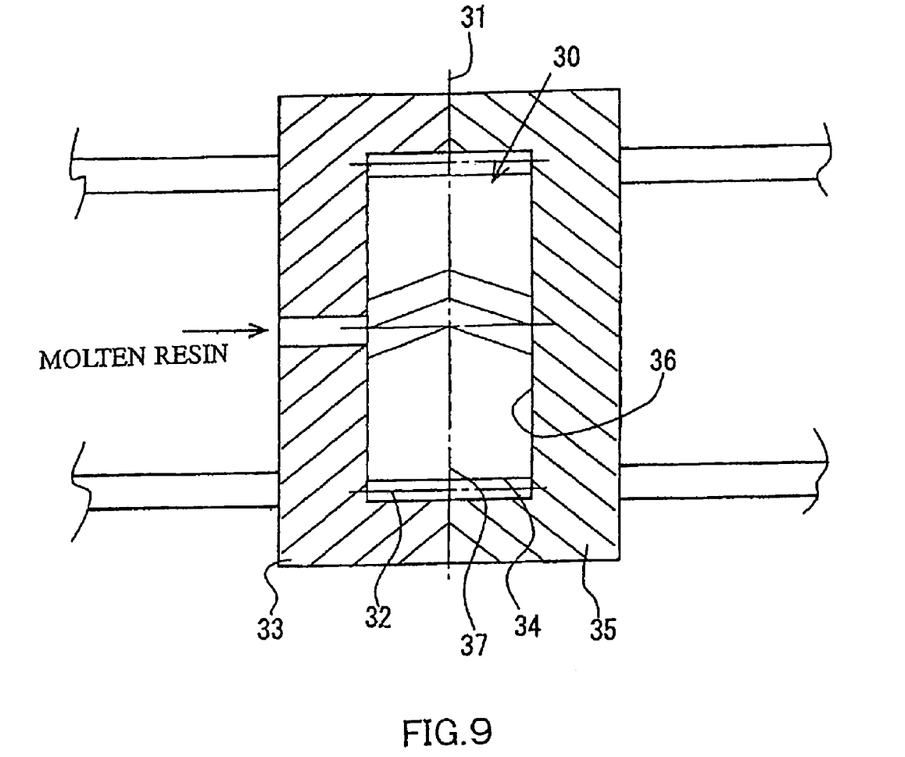
FIG. 9 is a cross-sectional view of an injection-molding mold that forms a resin double-helical gear of a conventional example.
Figure 10:
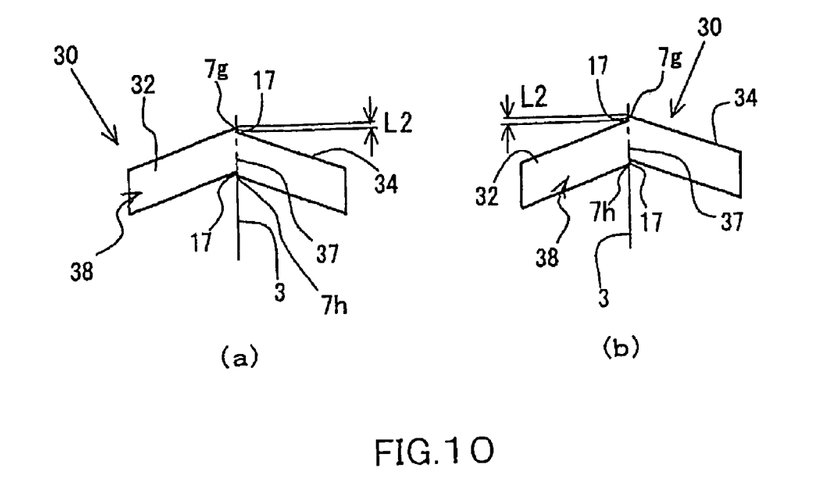
FIG. 10 is diagrams of a first gear section (helical gear) and a second gear section (helical gear) of the conventional resin double-helical gear in a misaligned state.

A resin double-helical gear 30 in Patent Literature 1 is formed by injection-molding, through use of two separate molds, as shown in FIG. 9. In other words, a first mold 33 and a second mold 35 are butted against each other. The first mold 33 forms a section from a tooth width center section 31 to one tooth width direction end side (first gear section 32). The second mold 35 forms a section from the tooth width direction center section 31 to another tooth width direction end side (second gear section 34). A butted section between the first mold 33 and the second mold 35 forms a cavity 36. Molten resin is injected into the cavity 36, and cooled and hardened within the cavity 36. The first mold 33 and the second mold 35 are then separated. The hardened resin is removed from the cavity 36. A large number of resin double-helical gears 30 can be formed within a short amount of time by injection-molding such as this.

Patent Literature 1: Japanese Patent Laid-open Publication No. Heisei 10-315344

However, when the resin double-helical gear is formed as described above, by two separate molds (the first mold 33 and the second mold 35) being butted against each other and molten resin being injected into the cavity 36 formed by the molds 33 and 35, a misalignment may occur on a butted surface 37 between the molds 33 and 35. When even the slightest misalignment is present, a misalignment L2 occurs on a connection surface 3 (a surface corresponding to the butted surface 37) between the first gear section 32 and the second gear section 34 of the injection-molded resin double-helical gear 30. An uneven section (misalignment) 17 is formed in a peak section 7g of an angular tooth 38 and a valley section 7h on the back surface side of the peak section 7g. When the uneven section 17 is formed in the peak section 7g and the valley section 7h of the angular tooth 38, power transmission is performed by only half of the tooth in the tooth width direction (the first gear section 32 or the second gear section 34). The same thrust load as that in the helical gear is generated.

When the uneven section 17 is formed and the resin double-helical gear 30 meshes with a mating resin double-helical gear, contact between tooth surfaces is not performed smoothly at the uneven section 17, thereby causing noise.

Resin double-helical gears are recently being widely used as the power transmission mechanism in the above-described office equipment, automobile components, precision machinery, various electronic devices, and the like. Rotation is not limited to one direction. The resin double-helical gear is often used in situations requiring the resin double-helical gear to rotate in the other direction and in situations in which a driving gear and a driven gear rotate in opposite directions. Therefore, there is a strong demand for suppression of the thrust load and noise caused by the uneven section 17, such as that described above, in both rotation directions (one direction and the other direction) of the resin double-helical gear.

SUMMARY OF THE INVENTION

Therefore, an object of the present invention is to provide a resin double-helical gear that can effectively prevent meshing failure without compromising tooth strength and suppress thrust load and noise in both rotation directions, even when unevenness occurs in a tooth width direction center section of the resin double-helical gear.

The present invention is related to a resin double-helical gear having an angular tooth. In the resin double-helical gear of the invention, among two tooth flanks sandwiching a tooth crest of the tooth, a tooth flank on a side including an angular peak section is a peak-side tooth flank and a tooth flank on an opposite side is a valley-side tooth flank. When a standard tooth having a tooth thickness that is constant at arbitrary positions from one tooth width direction end section to a tooth width direction center section and from another tooth width direction end section to the tooth width direction center section of the tooth is assumed, the peak-side tooth flank of the tooth is formed such as to become farther away from the peak-side tooth flank of the standard tooth towards the valley-side tooth flank of the standard tooth, the closer the peak-side tooth flank of the tooth is to the tooth width direction center section from the one tooth width direction end section and the other tooth width direction end section. The valley-side tooth flank of the tooth is formed such as to become farther away from the valley-side tooth flank of the standard tooth towards the peak-side tooth flank of the standard tooth, the closer the valley-side tooth flank of the tooth is to the tooth width direction center section from the one tooth width direction end section and the other tooth width direction end section. A meshing escape section of which dimensions in a tooth thickness direction increase from the one tooth width direction end section and the other tooth width direction end section towards the tooth width direction center section is formed between the peak-side tooth flank of the standard tooth and the peak-side tooth flank of the tooth and between the valley-side tooth flank of the standard tooth and the valley-side tooth flank of the tooth.

The present invention is a resin double-helical gear in which a twist angle of the peak-side tooth flank of the tooth is set to be smaller than a twist angle of a tooth flank of the standard tooth. In addition, a twist angle of the valley-side tooth flank of the tooth is set to be larger than the twist angle of the tooth flank of the standard tooth.

The present invention is a resin double-helical gear in which the dimensions of the meshing escape section in the tooth thickness direction near the tooth width direction center section are larger on the tooth crest side than a bottom land side.

Effect of the Invention

In the present invention, the meshing escape sections are formed on the peak-side tooth flank side and the valley-side tooth flank side of the angular tooth. Therefore, even when uneven sections (misalignment) occur in a peak section on the peak-side tooth flank side and a section (valley section) on the valley-side tooth flank side corresponding with the peak section, neither uneven section comes into contact with tooth flanks of a mating resin double-helical gear when the resin double-helical gear meshes with the mating resin double-helical gear. Therefore, unnecessary thrust load and noise can be reduced. Moreover, thrust load and noise during rotation of the resin double-helical gear in both directions can be reduced. Furthermore, the meshing escape section is formed such that the dimensions in the tooth thickness direction increase from the one tooth width direction end section and the other tooth width direction end section towards the tooth width direction center section. In other words, the tooth thickness of the angular tooth does not suddenly decrease near the tooth width direction center section. Rather, the tooth thickness of the angular tooth gradually decreases from the one tooth width direction end section and the other tooth width direction end section towards the tooth width direction center section. Therefore, a cross-sectional area in the direction perpendicular to the tooth width direction does not suddenly change. As a result, compared to when the cross-sectional area of the tooth suddenly changes, the strength of the tooth can be sufficiently secured.

In the present invention, regarding the twist angles of the peak-side tooth flank and the valley-side tooth flank of the tooth in relation to the twist angle of the tooth flank of the standard tooth, the twist angle of the peak-side tooth flank is set to be smaller that that of the standard tooth. The twist angle of the valley-side tooth flank is set to be larger than that of the standard tooth. As a result, the meshing escape section can be formed on the peak-side tooth flank side and the valley-side tooth flank side. The dimensions of the meshing escape section in the tooth thickness direction gradually increase towards the tooth width direction center section. Therefore, even when the meshing escape section is provided, the peak-side tooth flank and the valley-side tooth flank of the angular tooth can come into relatively smooth contact with the tooth flanks of the tooth on the mating side. Under an assumption of a helical gear that is the resin double-helical gear divided in half at the tooth width direction center section, the twist angle of the resin double-helical gear is complies with the twist angle of the helical gear.

In the present invention, for example, when the uneven sections formed in the peak-section and the valley-section of the angular tooth are caused by a phase-direction shift that tends to occur on a butted surface of two molds, if the positions in the tooth width direction are the same, it can be considered that the uneven section is larger on a tooth crest side corresponding to an outward radial direction and smaller on a bottom land side corresponding to an inward radial direction. Therefore, in response, the dimensions of the meshing escape section in the tooth thickness direction near the tooth width direction center section are greater on the tooth crest side compared to the bottom land side. As a result, the dimension of the meshing escape section can be prevented from being set larger than necessary. The strength of the tooth can be prevented from becoming unnecessarily weakened.

BRIEF DESCRIPTION OF THE DRAWINGS

FIG. 5($a$) is a diagram of a first aspect; FIG. 5($b$) is a diagram of a second aspect;

FIG. 8($a$) is a diagram of a first aspect; FIG. 8($b$) is a diagram of a second aspect;

FIG. 10($a$) is a diagram of a first aspect; and FIG. 10($b$) is a diagram of a second aspect.

DETAILED DESCRIPTION OF THE PREFERRED EMBODIMENT

Embodiments of the present invention will be described in detail, with reference to the accompanying drawings First Embodiment An embodiment of the present invention will be described in detail with reference to the accompanying drawings.

Figure 1:
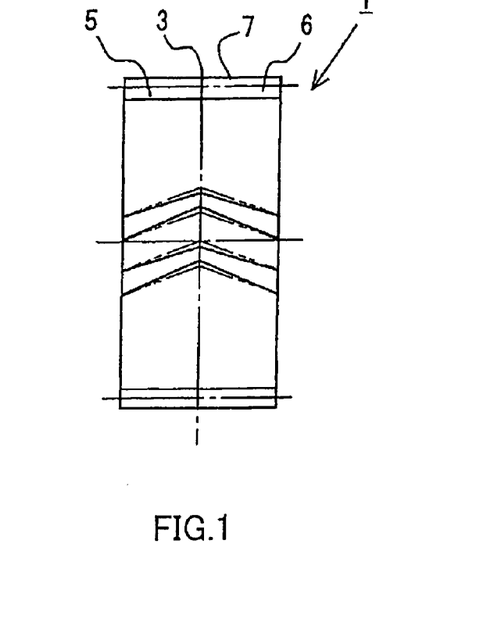
FIG. 1 is a front view of a resin double-helical gear when an axis is in a horizontal direction.
Figure 2:
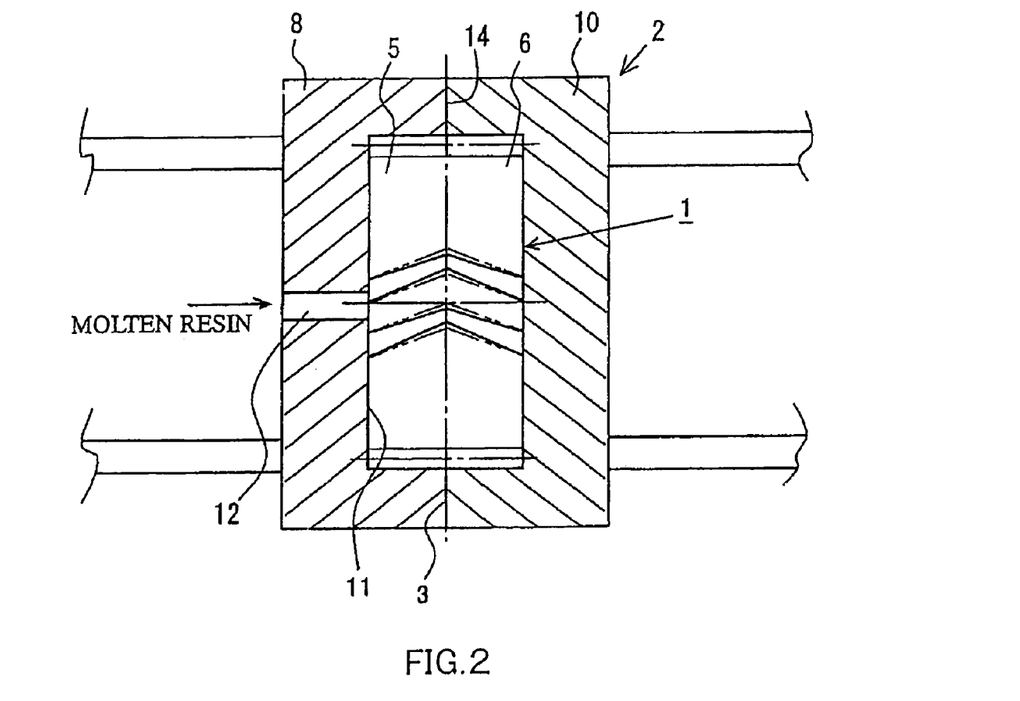
FIG. 2 is a schematic cross-sectional view of an injection-molding mold used to form the resin double-helical gear.
Figure 3:
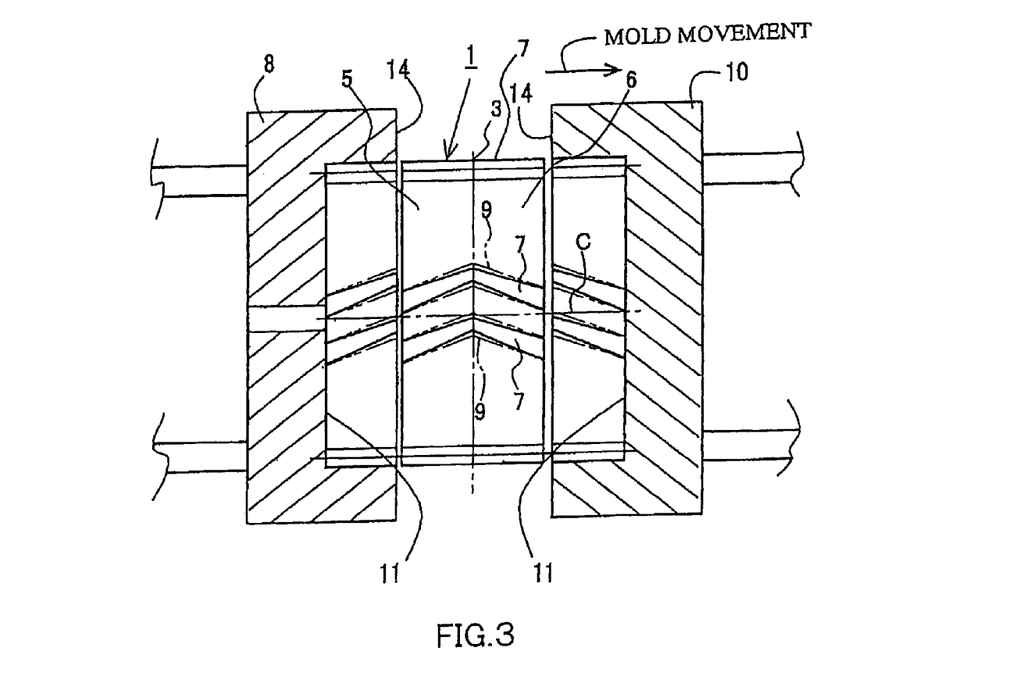
FIG. 3 is a schematic cross-sectional view of when the injection-molding mold is released.
Figure 4:
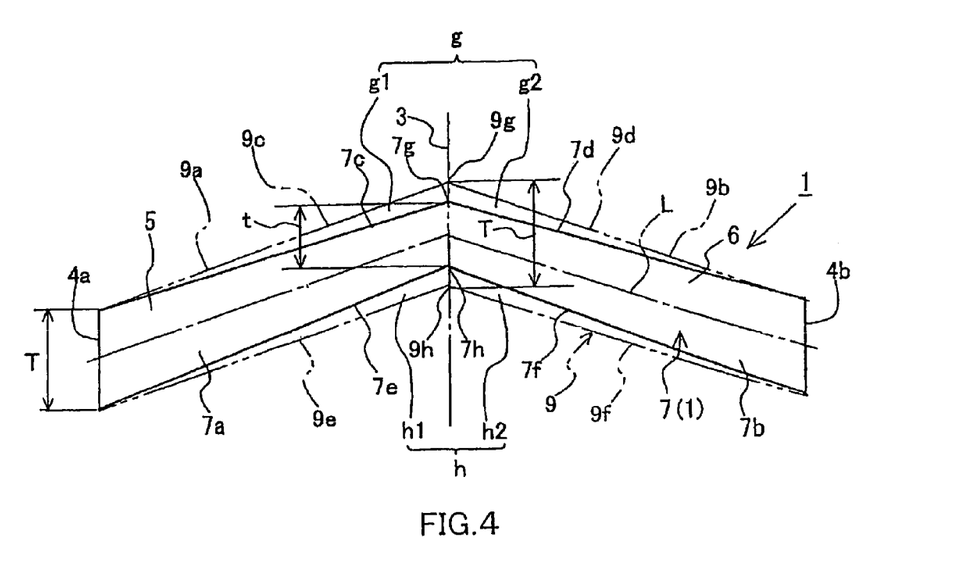
FIG. 4 is an enlarged planar view of a tooth of the resin double-helical gear.
Figure 5:
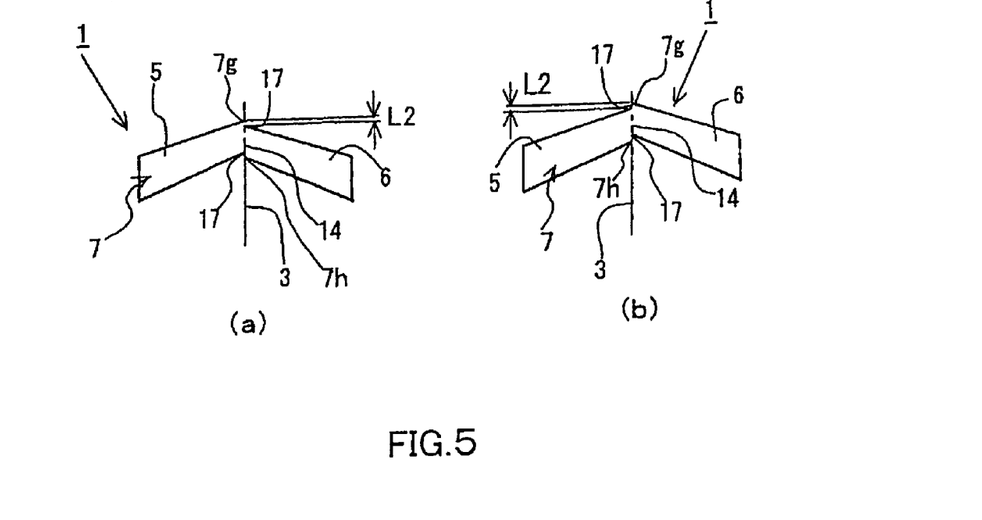
FIG. 5 is diagrams of a first gear section (helical gear) and a second gear section (helical gear) of the resin double-helical gear in a misaligned state.

A resin double-helical gear 1 of the invention will be described with reference to FIG. 1 to FIG. 4. FIG. 1 is a front view of the resin double-helical gear 1 when an axis C is in a horizontal direction (left-to-right direction in the drawing). FIG. 2 is a schematic cross-sectional view of an injection-molding mold 2 used to form the resin double-helical gear 1. FIG. 3 is a schematic cross-sectional view of when the injection-molding mold 2 is released. FIG. 4 is an enlarged planar view of a tooth of the resin double-helical gear 1. According to the embodiment, an example will be described in which a cross-sectional shape of respective tooth flanks (peak-side tooth flanks 7$c$, 7$d$, 9$c$, and 9$d$, and valley-side tooth flanks 7$e$, 7$f$, 9$e$, and 9$f$) of a tooth 7 and a standard tooth 9, described hereafter, is an involuted curved line when the tooth flanks are on a plane perpendicular to a tooth width direction.

As shown in FIG. 1, the resin double-helical gear 1 is formed such that two helical gears with opposite twist directions are adhered together. In other words, the resin double-helical gear 1 includes a first gear section 5 (one helical gear; accordingly referred to, hereinafter, as "helical gear 5") and a second gear section 6 (the other helical gear; accordingly referred to, hereinafter, as "helical gear 6"). With a tooth width direction center section 3 as a reference point, the first gear section 5 is positioned on one tooth width direction end section 4a side (end section on the left-hand side in the drawing). The second gear section 6 is positioned on the opposing other tooth width direction end section 4b side (end section on the right-hand side in the drawing). A tooth 7 has an angular shape (a rough inverted "V"-shape). In FIG. 1, a tooth 7a on the helical gear 5 side of which the right-hand side slopes upwards (twist direction is left) and a tooth 7b of which the left-hand side slopes upwards (twist direction is right) are integrated by the respective right-end surface and left-end surface being joined.

As described hereafter, in the present invention, a tooth thickness of the tooth 7 (a thickness of the tooth 7 measured at a pitch-circle at a cross-section taken along a plane perpendicular to the axis C) of the resin double-helical gear 1 decreases from the one tooth width direction end section 4a and the other tooth width direction end section 4b toward the tooth width direction center section 3. Hereafter, to facilitate understanding of the invention, a tooth having a constant tooth thickness regardless of the tooth width direction is referred to as a standard tooth 9. The standard tooth 9 is compared with the tooth 7 according to the embodiment. In the drawing, hereafter, the standard tooth 9 is shown by a dot-dot-dashed line.

FIG. 2 shows an injection-molding mold 2 used when the resin double-helical gear 1, described above, is formed by injection-molding. The injection-molding mold 2 includes a first mold 8 and a second mold 10. The first mold 8 forms the helical gear 5 side. The second mold 10 forms the helical gear 6 side. The molds 8 and 10 are used butted against each other on a butted surface 14. A cavity 11 is formed between the molds 8 and 10 in the butted state. Molten resin (such as polyacetal, polyamide, polyphenylene sulfide, or polybutylene terephthalate) is injected into the cavity 11 from a gate 12 such that the cavity 11 is filled with the molten resin. The molten resin is then cooled and hardened. As shown in FIG. 3, at least one of either the first mold 8 or the second mold 10 is separated from the other mold (according to the embodiment, the second mold 10 is separated from the first mold 8). As a result, a resin product to which the shape of the cavity 11 is transferred is released. The resin product is the resin double-helical gear 1 of the invention.

FIG. 4 is an enlarged, schematic planar view of a single tooth 7 among a plurality of teeth 7 of the resin double-helical gear 1 that is injection-molded as described above. Specifically, FIG. 4 shows a cross-sectional shape of one tooth 7 of the resin double-helical gear 1, taken along a tooth width direction (left-to-right direction in the drawing) at a pitch-circle.

First, the standard tooth 9 will be described with reference to FIG. 4. The standard tooth 9 is indicated in the drawing by the dot-dot-dashed line. The standard tooth 9 includes a standard tooth 9a corresponding to the tooth 7a of the helical gear 5, described above, and a standard tooth 9b corresponding to the tooth 7b of the helical gear 6. The twist directions of the standard teeth 9a and 9b are horizontally opposite. The standard teeth 9a and 9b have a same twist angle θ (>0). An angular standard tooth 9 is formed by the standard teeth 9a and 9b being joined. Among two tooth flanks in the standard tooth 9 sandwiching a tooth crest L (indicated for convenience as a straight line bending into an angular shape), the tooth flank including an angular peak section 9g is referred to as peak-side tooth flanks 9c and 9d. The tooth flank positioned opposite to the peak-side tooth flanks 9c and 9d and including a valley section 9h is referred to as valley-side tooth flanks 9e and 9f. In this case, the standard tooth 9 (the standard teeth 9a and 9b) is formed such that cross-sectional shapes taken along a plane perpendicular to the tooth width direction at arbitrary positions in the tooth width direction (left-to-right direction in FIG. 4), namely arbitrary positions from the one tooth width direction end section 4a to the other tooth width direction end section 4b via the tooth width direction center section 3, are the same (congruent). Therefore, a tooth thickness T that is the thickness of the standard tooth 9 measured at the pitch-circle (not shown) is the same at any position in the tooth width direction. Dimensions of the standard tooth 9 in the tooth thickness direction measured near the bottom land and at the tooth crest L are also the same at any position in the tooth width direction. This indicates that the peak-side tooth flank 9c and the valley-side tooth flank 9e of the standard tooth 9a have the same twist angle θ, and the peak-side tooth flank 9d and the valley-side tooth flank 9f of the standard tooth 9b have the same twist angle θ.

Figure 7:
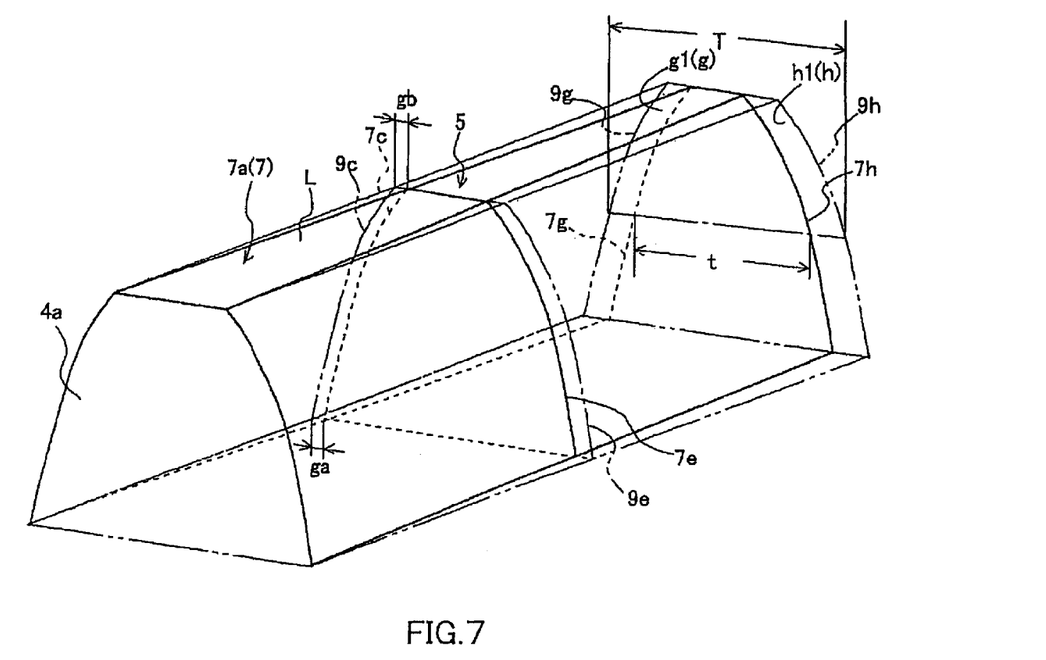
FIG. 7 is an enlarged perspective view of one tooth and one standard tooth of the resin double-helical gear cut away near a bottom land.

Next, the tooth 7 of the resin double-helical gear 1 of the invention will be described in detail with reference to FIG. 4 and FIG. 7. Here, FIG. 7 is an enlarged perspective view of the tooth 7a and the standard tooth 9a on the helical gear 5 side of the tooth 7 and the standard tooth 9 in the resin double-helical gear 1 cut away near the bottom land. In other words, FIG. 7 is a perspective view of the tooth 7a and the standard tooth 9a of the tooth 7 and the standard tooth 9 positioned to the left of the tooth width center section 3. According to the embodiment, the tooth 7a and the standard tooth 9a of the tooth 7 and the standard tooth 9 are symmetrical, and the tooth 7b and the standard tooth 9b of the tooth 7 and the standard tooth 9 are symmetrical, with the tooth width direction center section 3 as the reference point. In other words, when the tooth width center section 3 is viewed as a surface, with this surface as the reference point, the tooth 7a and the standard tooth 9a, and the tooth 7b and the standard tooth 9b have a mutual mirroring-relationship. Therefore, hereafter, explanations regarding the tooth 7b and the standard tooth 9b are omitted accordingly.

As shown in FIG. 4 and FIG. 7, the tooth 7 of the resin double-helical gear 1 is formed into almost the same shape as the above-described standard tooth 9. Here, "almost" indicates that, according to the embodiment, the shapes are the same with exception to differing twist angles, as described hereafter. As shown in FIG. 4, the tooth 7 includes the tooth 7a on the helical gear 5 side and the tooth 7b on the helical gear 6 side. An angular shape is formed by the teeth 7a and 7b being joined. Among the two tooth flanks in the standard tooth 9 sandwiching the tooth crest L, the tooth flank including an angular peak section 7g is referred to as peak-side tooth flanks 7c and 7d. The tooth flank positioned opposite to the peak-side tooth flanks 7c and 7d and including a valley section 7h is referred to as valley-side tooth flanks 7e and 7f.

According to the embodiment, whereas the twist angle of the peak-side tooth flank 9c of the standard tooth 9a is θ, as described above, the twist angle of the peak-side tooth flank 7c of the tooth 7a is set to a smaller twist angle than θ. In other words, when a>0, the twist angle of the peak-side tooth flank 7c is set to (θ−a). As a result, a cross-sectional shape of the peak-side tooth flank 7c in the direction perpendicular to the tooth width direction at an arbitrary position in the tooth width direction is the same as that of the peak-side tooth flank 9c of the standard tooth 9a. The peak-side tooth flank 7c is disposed such as to become farther away from the peak-side tooth flank 9c, from the one tooth width direction end section 4a towards the tooth width direction center section 3. At the same time, whereas the twist angle of the valley-side tooth flank 9e of the standard tooth 9a is θ, the valley-side tooth flank 7e of the tooth 7a is set to a larger twist angle than θ. In other words, the twist angle of the valley-side tooth flank 7e is set to (θ+a). As a result, a cross-sectional shape of the valley-side tooth flank 7e in the direction perpendicular to the tooth width direction at an arbitrary position in the tooth width direction is the same as that of the valley-side tooth flank 9e of the standard tooth 9a. The valley-side tooth flank 7e is disposed such as to become farther away from the valley-side tooth flank 9e, from the one tooth width direction end section 4a towards the tooth width direction center section 3. As a result, the tooth thickness of the tooth 7a relative to the standard tooth 9a becomes the thickest at the one tooth width direction end section 4a and is the tooth thickness T of the standard tooth 9a. The tooth thickness gradually decreases from the one tooth width direction end section 4a towards the tooth width direction center section 3. The tooth thickness becomes the thinnest thickness t (t<T) at the tooth width direction center section 3. In this way, the closer the peak-side tooth flank 7c and valley-side tooth flank 7e of the tooth 7a are to the tooth width direction center section 3, the farther both peak-side tooth flank 7c and valley-side tooth flank 7e of the tooth 7a are from the peak-side tooth flank 9c and valley-side tooth flank 9e of the standard tooth 9a in an inward direction. Therefore, from a different perspective, meshing escape sections g1 and h1 are formed between the peak-side tooth flanks 9c and 7c and between the valley-side tooth flanks 9e and 7e. Dimensions of the escape sections g1 and h1 in the tooth thickness direction increase from the one tooth width direction end section 4a towards the tooth width direction center section 3. The same applies to the helical gear 6 side, shown in FIG. 4. Meshing escape sections g2 and h2 are formed between the peak-side tooth flanks 9d and 7d of the standard tooth 9b and the tooth 7b and between the valley-side tooth flanks 9f and 7f of the standard tooth 9b and the tooth 7b. Dimensions of the escape sections g2 and h2 in the tooth thickness direction increase from the other tooth width direction end section 4b towards the tooth width direction center section 3. The meshing escape sections g1 and g2 are integrated to form a meshing escape section g on the peak-side tooth flank 7c and 7d side of the tooth 7. The meshing escape sections h1 and h2 are integrated to form a meshing escape section h on the valley-side tooth flank 7e and 7f side of the tooth 7.

According to the embodiment, the meshing escape sections g and h are respectively formed on the peak-side tooth flanks 7c and 7d and the valley-side tooth flanks 7e and 7f of the resin double-helical gear 1 as described above. Therefore, excellent meshing with a mating resin double-helical gear can be achieved for rotation in both directions when the resin double-helical gear 1 rotates in one direction or the other direction. This point will be described hereafter.

Figure 6:
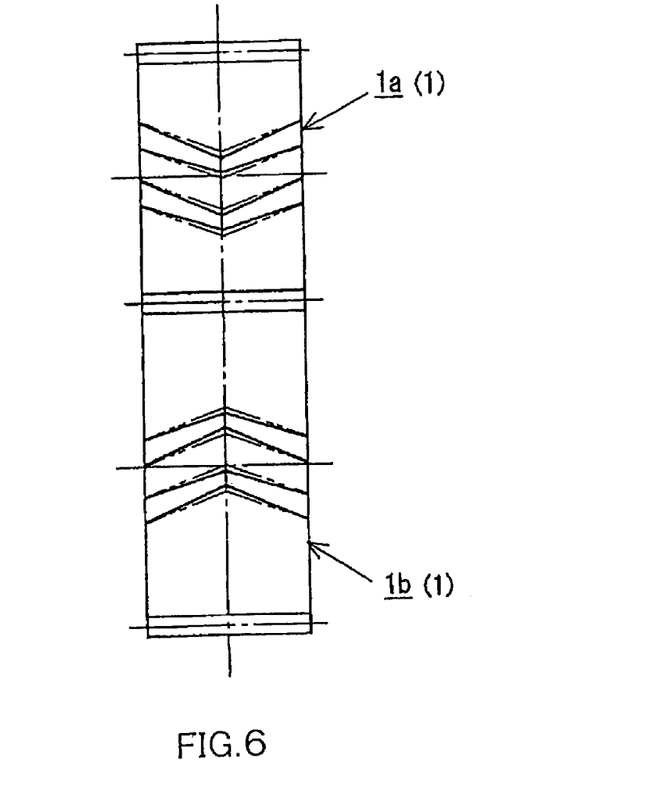
FIG. 6 is a front view of a resin double-helical gear according to an embodiment in use.
Figure 8:
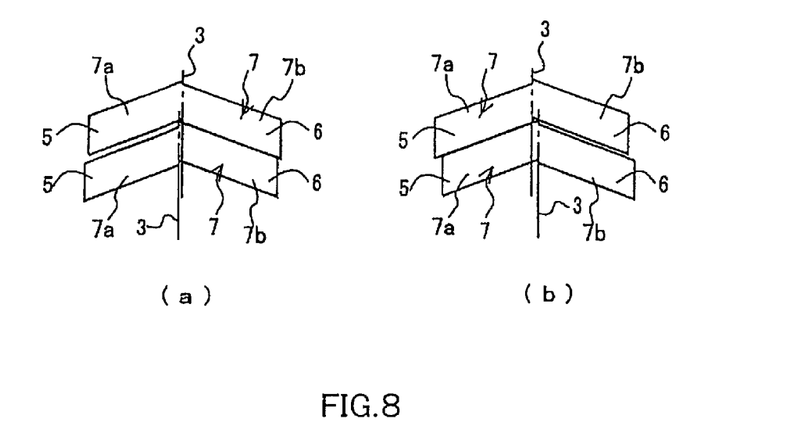
FIG. 8 is diagrams of a failure occurring a conventional resin double-helical gear during meshing.

When the resin double-helical gear 1 is injection-molded as shown in FIG. 2 and FIG. 3, and a misalignment occurs on the butted surface 14 of the first mold 8 and the second mold 10, a misalignment (L2) occurs on the connection surface 3 between the helical gear 5 and the helical gear 6. The uneven section 17 is formed in the angular peak section 7g and the valley section 7h on the back surface side of the peak section 7g. In this case, if the meshing escape sections g and h are not formed as shown in FIG. 4, when a pair of resin double-helical gears 1 (1a and 1b) mesh as shown in FIG. 6, only one of either the helical gear 5 or the helical gear 6 meshes with the tooth 7 of the meshing mating gear (resin double-helical gear 1), as shown in FIG. 8(a) and FIG. 8(b). Power transmission is performed by only half of the tooth 7 in the tooth width direction. As a result, the same thrust load as that in the helical gear is generated in the resin double-helical gear 1.

FIG. 8(a) is an example of an aspect in which the power transmission is performed by only the tooth 7b of the helical tooth 6 within the tooth 7. At the same time, FIG. 8(b) is an example of an aspect in which power transmission is performed by only the tooth 7a of the helical gear 5.

However, in the resin double-helical gear 1 according to the embodiment, the meshing escape section g is formed on the peak-side tooth flanks 7c and 7d side of the angular tooth 7. The meshing escape section h is formed on the valley-side tooth flank 7e and 7f of the angular tooth 7. Therefore, the meshing escape section g on the peak-side tooth flanks 7c and 7d side corresponds with the uneven section 17 on the valley section 7h side of the tooth 7 of the meshing mating gear. The meshing escape section h on the valley-side tooth flanks 7e and 7f side corresponds with the uneven section 17 on the valley section 7g side of the tooth 7 of the meshing mating gear. Both meshing escape sections g and h can prevent the uneven section 17 from interfering with the meshing mating gear. Therefore, in a meshing pair of resin double-helical gears 1, the helical gear 5 and the helical gear 5 smoothly come into contact with each other over almost all areas in the tooth width direction. In addition, the helical gear 6 and the helical gear 6 smoothly come into contact with each other over almost all areas in the tooth width direction. Power transmission can be performed upon required contact areas being secured. Therefore, generation of the thrust load can be prevented. Generation of noise caused by the tooth 7 of one resin double-helical gear 1 coming into contact with the uneven section 17 of the other resin double-helical gear 1 meshing with the one double-helical gear 1 can also be prevented.

An amount of misalignment on the butted surface 14 between the first mold 8 and the second mold 10 is measured for each injection-molding device to be used or is predicted through simulation tests and the like. An amount of escape (T−t)/2 of each meshing escape section g and h is decided such that the amount is equal to the measured value or predicted value of misalignment, or greater than these values.

In the resin double-helical gear 1 according to the embodiment, configured as described above, even when a misalignment occurs on the connection surface 15 between the helical gear 5 and the helical gear 6, the uneven section 17 caused by the misalignment on the connection surface 15 can be absorbed by the meshing escape sections g and h. Power transmission can be performed in almost all areas of the angular tooth 7 in the tooth width direction. A quiet, high-load, high-rotation power transmission can be performed.

Moreover, in the resin double-helical gear 1 according to the embodiment, power transmission can be performed in almost all areas of the angular tooth 7 in the tooth width direction. Therefore, the thrust load like that in the helical gear is not generated. The thrust load is not required to be received by a thrust bearing. As a result, according to the embodiment, because the thrust bearing is not required, the resin double-helical gear 1 can be disposed in a narrow space. Furthermore, reductions in weight and costs can be achieved.

The meshing escape sections g and h are formed such that the dimensions in the tooth thickness direction increases from the one tooth width direction end section 4a and the other tooth width direction end section 4b towards the tooth width direction center section 3. In other words, the tooth thickness of the angular tooth 7 does not suddenly become thin near the tooth width direction center section 3. Rather, the tooth thickness of the angular tooth 7 gradually decreases from the one tooth width direction end section 4a and the other tooth width direction end section 4b towards the tooth width direction center section 3. Therefore, a cross-sectional area of the tooth 7 in the direction perpendicular to the tooth width direction does not suddenly change. As a result, compared to when the cross-sectional area of the tooth 7 suddenly changes, the strength of the tooth 7 can be sufficiently secured.

In the description above, the twist angle of the peak-side tooth flank 7c of the tooth 7 is set to (θ−a) and the twist angle of the valley-side tooth flank 7e is set to (θ+a) in relation to the twist angle θ of the peak-side tooth flank 9c and the valley-side tooth flank 9e of the standard tooth 9. In other words, when the twist angle θ of the peak-side tooth flank 9c and the valley-side tooth flank 9e of the standard tooth 9, a difference a of the twist angle of the peak-side tooth flank 7c of the tooth 7 and a difference a of the twist angle of the valley-side tooth flank 7e of the tooth 7 are set to be the same. As a result, the dimensions of the meshing escape section g on the peak-side tooth flanks 7c and 7d side in the tooth thickness direction and the dimensions of the meshing escape section h on the valley-side tooth flanks 7d and 7e side in the tooth thickness direction are both (T−t)/2. Therefore, both dimensions are equal to each other.

However, the tooth thickness of the tooth 7 decreases as the above-described dimensions of the meshing escape sections g and h in the tooth thickness direction increase. Therefore, the meshing escape sections g and h are preferably set to a required minimum dimension. From this perspective, the twist angle difference a of the peak-side tooth flank 7c and the valley-side tooth flank 7e of the tooth 7 in relation to the twist angle θ of the peak-side tooth flank 9c and the valley-side tooth flank 9e of the standard tooth 9 is not necessarily required to be the same. For example, when the rotation of the resin double-helical gear 1 is mainly in a direction moving from the valley section 7h to the peak section 7g, and the opposite rotation direction is ancillary, the difference of the twist angle on the peak-side tooth flank 7c side can be set to be larger than the difference of the twist angle on the valley-side tooth flank 7e side. Therefore, the overall thickness of the meshing escape section g can be set to be thicker than the overall thickness of the meshing escape section h. As a result, the thickness of the meshing escape section h becoming thicker than necessary can be effectively prevented.

Second Embodiment

According to the above-described first embodiment, as shown in FIG. 7, regarding the dimensions of the meshing escape section g1 (g) on the peak-side tooth flank 7e side of the tooth 7a (7) in the tooth thickness direction, when the positions in the tooth width direction are the same, the dimension (for example, ga) on the bottom land side (bottom-side in FIG. 7) and the dimensions (for example, gb) on the tooth crest L side are the same. All height dimensions from the bottom land to the tooth crest L are the same. The same applies to the meshing escape section h1 (h) on the valley-side tooth flank 7e side.

When the first mold 8 and the second mold 10 are butted against each other at the butted surface 14 and the above-described resin double-helical gear 1 is formed by injection-moldings as shown in FIG. 3, a shift in the rotation direction with the axis C as the center, namely a phase shift can be considered as one misalignment occurring on the butted surface 14. A large phase shift such as this occurs at a section far from the axis C rather than a section close to the axis C. In other words, the shift is greater on the tooth crest L side than the bottom land side in the tooth 7 of the resin double-helical gear 1.

Therefore, according to a second embodiment, the dimensions of the meshing escape sections g and h in the tooth thickness direction is made larger on the tooth crest L side than the bottom land side, near the tooth width direction center section 3 at which the uneven section 17 caused by the shift occurs. In other words, the dimensions of the meshing escape sections g and h in the tooth thickness direction on the bottom land side at which the uneven section 17 caused by the shift is small is made smaller than that on the tooth crest L side. The dimensions of the meshing escape sections g and h in the tooth thickness direction on the bottom land side are prevented from becomes larger than necessary.

In the description above, the dimensions of the meshing escape sections g and h in the tooth thickness direction near the tooth width direction center section 3 is larger on the tooth crest L side than the bottom land side. However, this is not limited thereto. The dimensions of the meshing escape sections g and h in the tooth thickness direction can be larger on the bottom land side than the tooth crest L side. When the embodiment is applied, the cross-sectional shape of the peak-side tooth flanks 7c and 7d and the valley-side tooth flanks 7e and 7f of the tooth 7 in the direction perpendicular to the tooth width direction is similar to an involuted curved line.

Third Embodiment

According to the above-described first embodiment and second embodiment, examples in which the tooth profile of the tooth 7 is involute are described. However, the invention is not limited thereto. The embodiments can be applied to when the tooth profile of the tooth 7 is, for example, a cycloid tooth profile, a circular arc tooth profile, or a trocoid tooth profile.

In the descriptions above, when the gear meshing with the resin double-helical gear 1 of the invention is a same resin double-helical gear 1 is described. However, the resin double-helical gear 1 of the invention is not limited thereto. The resin double-helical gear 1 of the invention can be used by meshing with a resin double-helical gear including the above-described standard teeth 9. However, in this case, the meshing escape sections g and h such as those described above are not formed in the resin double-helical gear including the standard teeth 9. Therefore, compared to when the resin double-helical gears 1 of the invention mesh, the dimensions of the meshing escape sections g and h in the tooth thickness direction are required to be set to large dimensions.

In the descriptions above, that the resin double-helical gear 1 of the invention becomes elastically deformed is not particularly mentioned. However, compared to a common metal double-helical gear of the same shape, a deformation amount of the resin double-helical gear 1 of the invention when a same load is applied is greater than that of the metal double-helical gear. In relation to this, the above-described meshing escape sections g and h are formed to a size such that, when the tooth 7 of resin double-helical gear 1 of the invention becomes elastically deformed as a result of meshing with the mating resin double-helical gear and the load being applied to the tooth 7, the vicinity of the peak section 7g and the vicinity of the valley section 7h of the tooth do not come into contact with the tooth flanks of the mating resin double-helical gear even when the uneven section 17 occurs in either the resin double-helical gear 1 of the invention or the mating resin double-helical gear, or both.

For simplicity, in the description above, the resin double-helical gear 1 is described as being formed by the helical gear 5 (first gear section 5) and the helical gear 6 (second gear section 6) being adhered together. The tooth 7 is described as being formed by the tooth 7a and the tooth 7b of the helical gear being adhered together. However, in actually, the overall resin double-helical gear 1 of the invention is formed integrally.

Industrial Applicability

The resin double-helical gear of the present invention is widely used in power transmission mechanisms in image forming devices such as copiers, printers, and facsimile machines, automobile components, precision machinery, electronic devices, and the like requiring quiet, high-speed rotation, high-load power transmission, reduction in weight, and reduction in product price.

What is claimed is:

1. A resin double-helical gear having an angular tooth, wherein:

among two tooth flanks sandwiching a tooth crest of the tooth, a tooth flank on a side including an angular peak section is a peak-side tooth flank and a tooth flank on an opposite side is a valley-side tooth flank, and when a standard tooth having a tooth thickness that is constant at arbitrary positions from one tooth width direction end section to a tooth width direction center section and from another tooth width direction end section to the tooth width direction center section of the tooth is assumed, the peak-side tooth flank of the tooth is formed such as to become farther away from the peak-side tooth flank of the standard tooth towards the valley-side tooth flank of the standard tooth, the closer the peak-side tooth flank of the tooth is to the tooth width direction center section from the one tooth width direction end section and the other tooth width direction end section, and the valley-side tooth flank of the tooth is formed such as to become farther away from the valley-side tooth flank of the standard tooth towards the peak-side tooth flank of the standard tooth, the closer the valley-side tooth flank of the tooth is to the tooth width direction center section from the one tooth width direction end section and the other tooth width direction end section;

a meshing escape section of which dimensions in a tooth thickness direction increases from the one tooth width direction end section and the other tooth width direction end section towards the tooth width direction center section is formed between the peak-side tooth flank of the standard tooth and the peak-side tooth flank of the tooth and between the valley-side tooth flank of the standard tooth and the valley-side tooth flank of the tooth;

a twist angle of the peak-side tooth flank of the tooth is set to be smaller than a twist angle of a tooth flank of the standard tooth; and a twist angle of the valley-side tooth flank of the tooth is set to be larger than the twist angle of the tooth flank of the standard tooth.

2. A resin double-helical gear having an angular tooth, wherein:

among two tooth flanks sandwiching a tooth crest of the tooth, a tooth flank on a side including an angular peak section is a peak-side tooth flank and a tooth flank on an opposite side is a valley-side tooth flank, and when a standard tooth having a tooth thickness that is constant at arbitrary positions from one tooth width direction end section to a tooth width direction center section and from another tooth width direction end section to the tooth width direction center section of the tooth is assumed, the peak-side tooth flank of the tooth is formed such as to become farther away from the peak-side tooth flank of the standard tooth towards the valley-side tooth flank of the standard tooth, the closer the peak-side tooth flank of the tooth is to the tooth width direction center section from the one tooth width direction end section and the other tooth width direction end section, and the valley-side tooth flank of the tooth is formed such as to become farther away from the valley-side tooth flank of the standard tooth towards the peak-side tooth flank of the standard tooth, the closer the valley-side tooth flank of the tooth is to the tooth width direction center section from the one tooth width direction end section and the other tooth width direction end section;

a meshing escape section of which dimensions in a tooth thickness direction increases from the one tooth width direction end section and the other tooth width direction end section towards the tooth width direction center section is formed between the peak-side tooth flank of the standard tooth and the peak-side tooth flank of the tooth and between the valley-side tooth flank of the standard tooth and the valley-side tooth flank of the tooth; and the dimensions of the meshing escape section in the tooth thickness direction near the tooth width direction center section is larger on the tooth crest side than a bottom land side.

* * * * *